United States Patent [19]

Seelhorst et al.

[11] Patent Number: 5,875,024

[45] Date of Patent: Feb. 23, 1999

[54] METHOD OF ADJUSTING A LASER DOPPLER ANEMOMETER

[75] Inventors: Ulrich Seelhorst; Frank Schmidt, both of Göttingen; Karl-Aloys Bütefisch, Bovenden; Karl-Heinz Sauerland, Nörten-Hardenberg; Jens Palluch, München, all of Germany

[73] Assignee: Deutsch Forschurgsanstalt fur Luft-und Raumfahrt e.V., Germany

[21] Appl. No.: 926,634

[22] Filed: Sep. 10, 1997

[30] Foreign Application Priority Data

Sep. 11, 1996 [DE] Germany .................. 196 36 922.3

[51] Int. Cl.$^6$ ....................................... G01P 3/36
[52] U.S. Cl. ............................................ 356/28.5
[58] Field of Search ................................. 356/28.5

[56] References Cited

U.S. PATENT DOCUMENTS

| | | | |
|---|---|---|---|
| 4,126,392 | 11/1978 | House | 356/28.5 |
| 4,637,717 | 1/1987 | Brudnoy | 356/28.5 |
| 5,090,801 | 2/1992 | Johnson | 356/28.5 |

*Primary Examiner*—Stephen C. Buczinski
*Attorney, Agent, or Firm*—Womble Carlyle Sandridge & Rice

[57] ABSTRACT

A method is provided for adjusting a laser doppler anemometer (1–5) having an emitting optic (3) which emits at least two laser beams (7, 8), and a receiving optic (4) for gathering light scattered by dispersed particles. The method comprises the steps of coupling a laser light (17) into an output of the receiving optic to make a focal point (12) of the receiving optic visible on a spaced reference surface (13); adjusting the receiving optic with respect to the surface so that the focal point of the receiving optic lies on the surface; and adjusting and regulating the emitting optic and the receiving optic with respect to each other so that a crossing point (11) of the laser beams coincides with the focal point of the receiving optic on the surface.

19 Claims, 9 Drawing Sheets

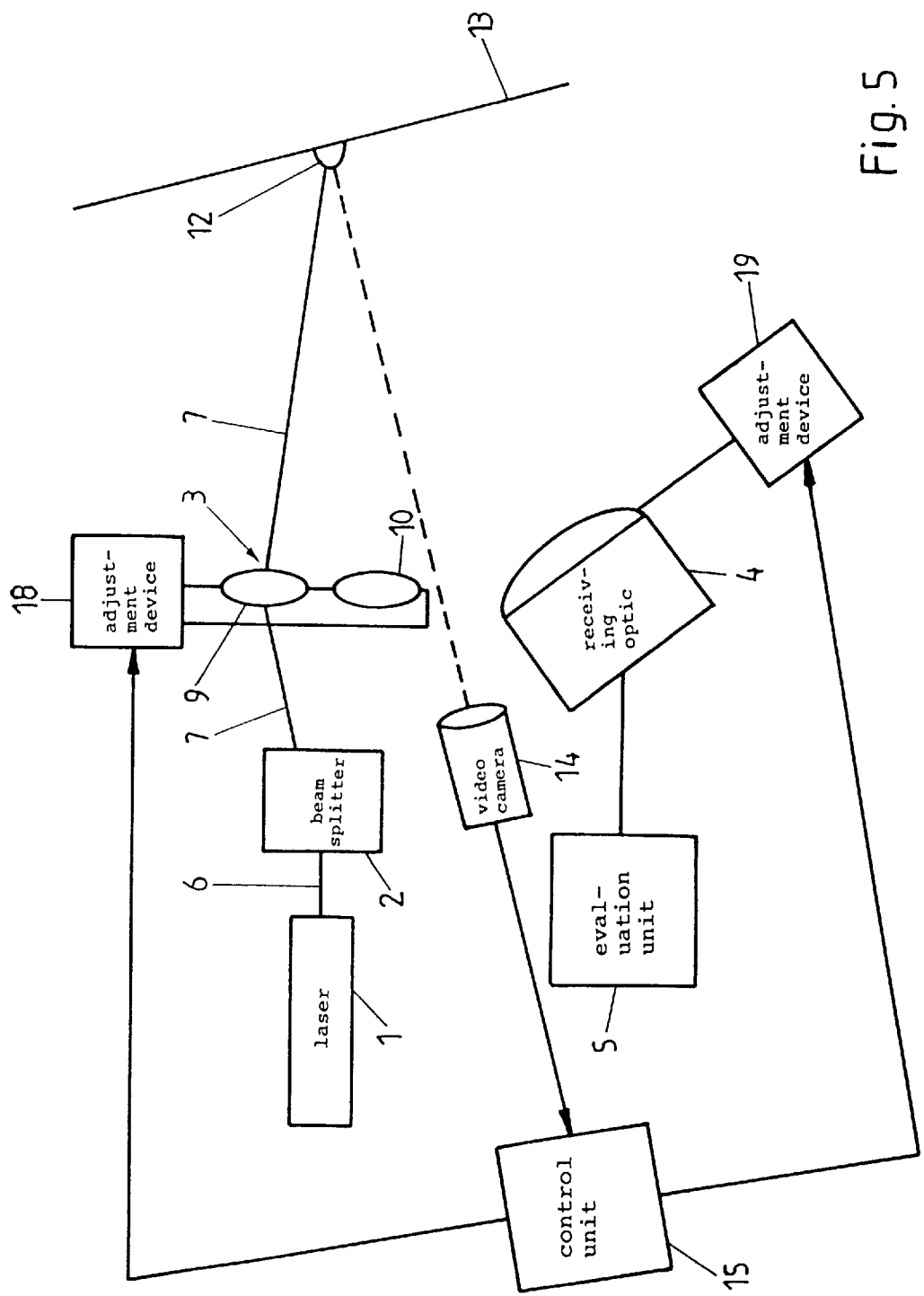

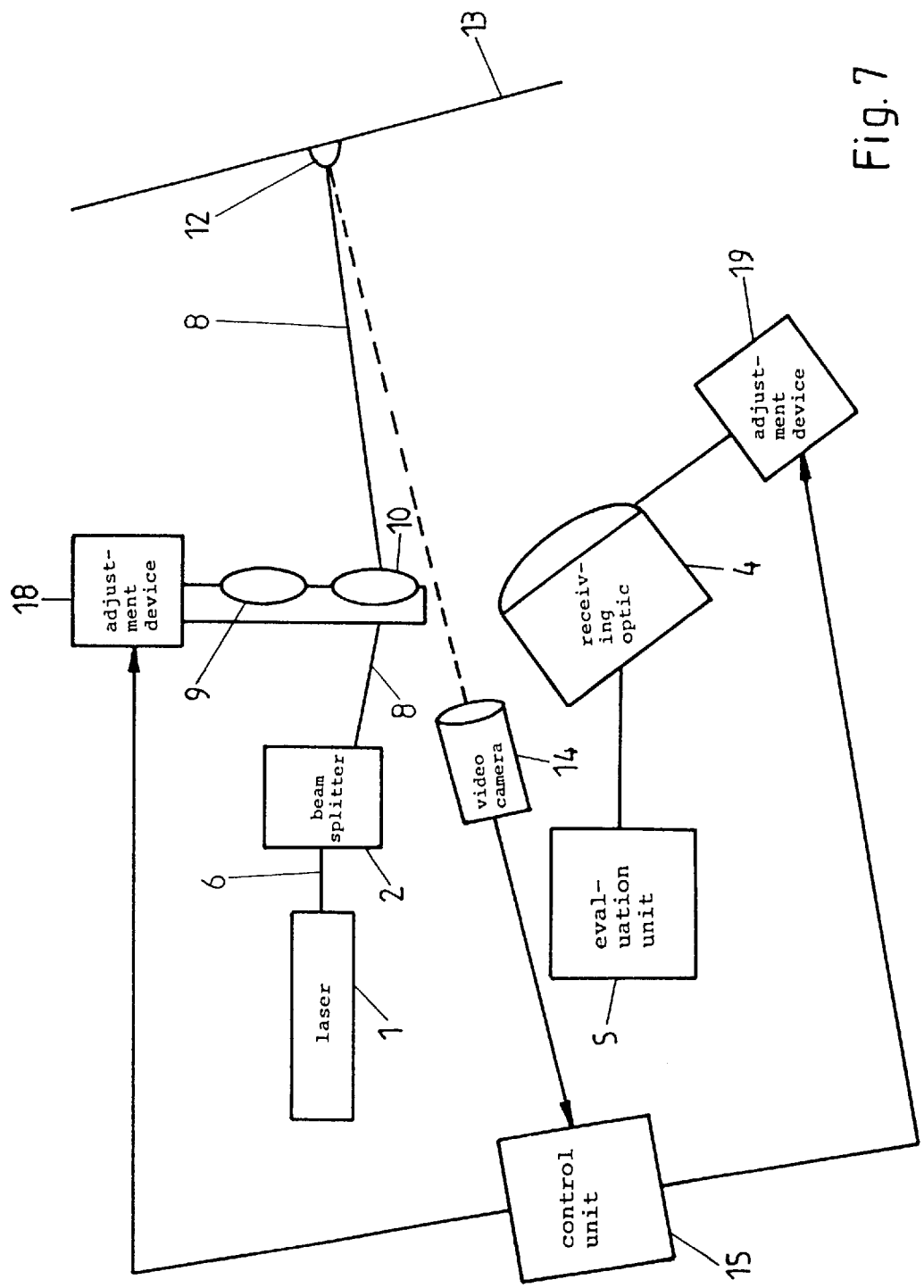

METHOD OF ADJUSTING A LASER DOPPLER ANEMOMETER

FIELD OF THE INVENTION

The invention relates to a method of adjusting a laser doppler anemometer having an emitting optic which emits at least two laser beams and a receiving optic for gathering light scattered by dispersed particles. Particularly, the invention relates to a method of adjusting such a laser doppler anemometer in which laser light is coupled into the output of the receiving optic to make the focal point of the receiving optic visible so that the focal point of the receiving optic can be adjusted to a crossing point of the laser beams.

BACKGROUND OF THE INVENTION

Existing laser doppler anemometers have an emitting optic, a receiving optic and an evaluation unit as basic components. The emitting optic emits two laser beams which cross at a crossing point. The crossing point displays a certain spatial expansion and defines a measurement volume. The receiving optic collects the light scattered by dispersed particles located in the measurement volume. To this end, the receiving optic is to be focused on the measurement volume.

This adjustment, i.e. the crossing of the two laser beams exactly at the focal point of the receiving, optic must be carried out with extreme precision in order to obtain correct speed measurement results with the laser doppler anemometer. The evaluation unit analyzes the scattered light received by the receiving optic and originating with the dispersed particles. Up to this point the structure of a single-component laser doppler anemometer has been described. In the case of multi-component laser doppler anemometers for each direction, in which the speed of the dispersed particles is to be determined, two laser beams running in the respective direction are superimposed on each other in the measurement volume.

The invention relates to the adjustment of either a single-component or multi-component laser doppler anemometer.

In a known method of adjusting a laser doppler anemometer, laser light is coupled into the output of the receiving optic to determine the focal point of the receiving optic. This focal point establishes the measurement volume position on the optical axis of the receiving optic. In the measurement volume, an apertured diaphragm is set up with a diameter in the magnitude of the laser beams' minimal total radiation width. The emitting optic is then adjusted so that the emitted laser beams completely penetrate the aperture of the apertured diaphragm. In order to increase precision, apertured diaphragms with smaller aperture diameters can subsequently be used when the adjustment steps are repeated. In addition, the aperture of the apertured diaphragm can be projected on a surface with a microscopic objective attached to the surface in order to be able to more precisely check the position of the laser beams in the aperture of the apertured diaphragm.

The known method has a number of shortcomings. Since the precision of the laser beams' coincidence has to be evaluated subjectively, the quality of the adjustment is strongly dependent on the operator's experience. Many wind tunnel working sections in which laser doppler anemometers are frequently used are closed off with windows. When penetrating the windows, the laser beams are refracted, leading to a shift in the position of the measurement volume in the wind tunnel. The magnitude of this shift is dependent upon the wavelength of the laser light used, the thickness of the window and the angle at which the laser beams strike the window. Taking this refraction into consideration when adjusting the laser beam is difficult since it is not possible to bring the apertured diaphragm and the microscopic objective into the wind tunnel. Even if this is possible, flows in the working section when the wind tunnel is in operation can lead to a modification of the optical properties of the fluid used, in particular to a modification of its refraction index. This results in variations in the amount and/or the direction of refraction of the incident laser beams at the interface between the fluid and the windows, limiting the working section. In this way a shift of the crossing point of the laser beams with respect to the focal point of the receiving optic can occur, which then no longer coincide. An adjustment of the laser doppler anemometer during ongoing wind tunnel operations is not possible with the known methods so that, where there are modifications of fluid properties, speed measurements cannot be conducted. Since refraction at an interface between media with different optical properties is dependent upon the wavelength of the light used, a modification of the refraction index of the fluid flowing through a wind tunnel is particularly strongly felt in multi-component laser doppler anemometers which typically work with laser light of different wavelengths. The laser beams of the different wavelengths are affected by modifications in the refraction index with different intensity.

SUMMARY OF THE INVENTION

It is an object of the invention to provide a method of adjusting a laser doppler anemometer which can be directly executed in a wind tunnel. In addition the new method should be easily automated and be capable of being repeated without difficulty during ongoing wind tunnel operations.

According to the present invention there is provided a method of adjusting a laser doppler anemometer comprising the steps of coupling laser light into the output of the receiving optic to make the focal point of the receiving optic visible; adjusting the receiving optic with respect to a surface so that the focal point of the receiving optic lies on the surface; and adjusting and regulating the emitting optic and the receiving optic with respect to each other so that the crossing point of the laser beams coincides with the focal point of the receiving optic on the surface.

This new method uses a surface in the working section, for example the surface of a model located in the wind tunnel, in order to make position changes in the focal point of the receiving optic and the laser beams of the emitting optic visible. Deliberate position changes are then made until the crossing point of the laser beams coincides on the surface with the focal point of the receiving optic. In doing so, beam deflections at interfaces between media with different optical properties, for example at windows, are automatically taken into consideration. If the adjustment is carried out during ongoing wind tunnel operations, then the modifications to the refraction index of the fluid used are automatically taken into account.

Preferably, at first the receiving optic with the laser light coupled into its output is adjusted with respect to the surface until the focal point of the receiving optic strikes the surface. Then the emitting optic is adjusted with respect to the receiving optic until the laser beams fall onto the surface in this focal point. During this step, the adjustment of the receiving optic is captured. The laser beams from the emitting optic can be adjusted individually to the focal point of the emitting optic on the surface. However, it is also possible to first seek an adjustment of the emitting optic in which the crossing point of the laser beams is on the surface and then to subsequently bring this crossing point into coincidence with the receiving optic's focal point.

Preferably the laser beams are not directed at the surface while the receiving optic's focal point is directed at the surface. In this way, the required adjustment of the receiving optic with respect to the surface is not adversely affected by the laser beams. Preferably no laser light will be coupled into the output of the laser light either while the crossing point of the laser beams or the individual laser beams are directed at the surface. In this way, impediments to the required adjustment of the emitting optic by light from the receiving optic are avoided. However, it is obvious that the focal point of the emitting optic must be established before decoupling the laser light from the emitting optic's output, since otherwise no relative adjustment of the laser beams to it would be possible.

Establishing the position of the focal point, or the position of the crossing point, or the position of each laser beam on the surface is preferably done using the center point of the light intensity distribution across the surface. In this way, an objective criterion is specified for the de facto position of the different light spots on the surface. This criterion can be objectively applied and verified by electro-optical devices.

The light intensity distribution across the surface is preferably registered with a video camera, particularly one orientated perpendicularly with respect to the surface. The light intensity distribution's center point can then be calculated in an extremely simple way from the image recorded and digitalized by the video camera. Here, it suffices if the digitalization of the light intensity distribution is accomplished with a two-level image. Digitalization of the light intensity distribution into a two-level image does not entail any significant loss of information, since in the method of the invention typically only symmetrical light intensity distributions appear. Distortions due to a video camera which is not orientated perpendicularly with respect to the surface, when recording light intensity distribution across the surface, are normally negligible, particularly if the surface in turn is not orientated perpendicularly to the laser beams and the optical axis of the receiving optic. In this case it is actually more advantageous to align the video camera independently of the surface, approximately parallel to the laser beams and the optical axis of the receiving optic.

The new method can be automated by having the emitting optic and the receiving optic automatically adjusted as a function of a closed loop control. With the closed loop control, feedback is accomplished by the light intensity distribution across the surface and by the light intensity center points which can be calculated from the light intensity distribution.

Besides the center point of the light intensity distribution across the surface, its variation from the center point can be determined as well. In this way it is possible to automatically establish whether the focal point of the receiving optic is imaged on the surface, since the variation is then minimal. It can likewise be ascertained whether the two laser beams cross in one point on the surface if both laser beams are simultaneously directed onto the surface. In that case, the double total light intensity should be determined. With higher light intensity resolution a check can also be made to see if the laser beams are themselves exactly focused on the surface.

The entire laser doppler anemometer can also be adjusted by means of the criterion of the minimal dispersion of the light intensity over the surface with laser beams directed at the surface and with laser light coupled into the receiving optic's output.

The new method of adjusting a laser doppler anemometer can also operate completely automatically. It is in particular suited for being automatically repeated during the measurement operation.

In the following, the method according to the invention is described and explained in greater detail by means of the described embodiments.

BRIEF DESCRIPTION OF THE DRAWINGS

FIG. 5 illustrates an adjustment of the first laser beam of the emitting optic of the laser doppler anemometer of FIG. 1 to the focal point of the receiving optic on the surface.

FIG. 7 illustrates an adjustment of the second laser beam of the emitting optic of the laser doppler anemometer of FIG. 1 to the focal point of the receiving optic on the surface.

DETAILED DESCRIPTION OF THE PREFERRED EMBODIMENTS

Figure 1:
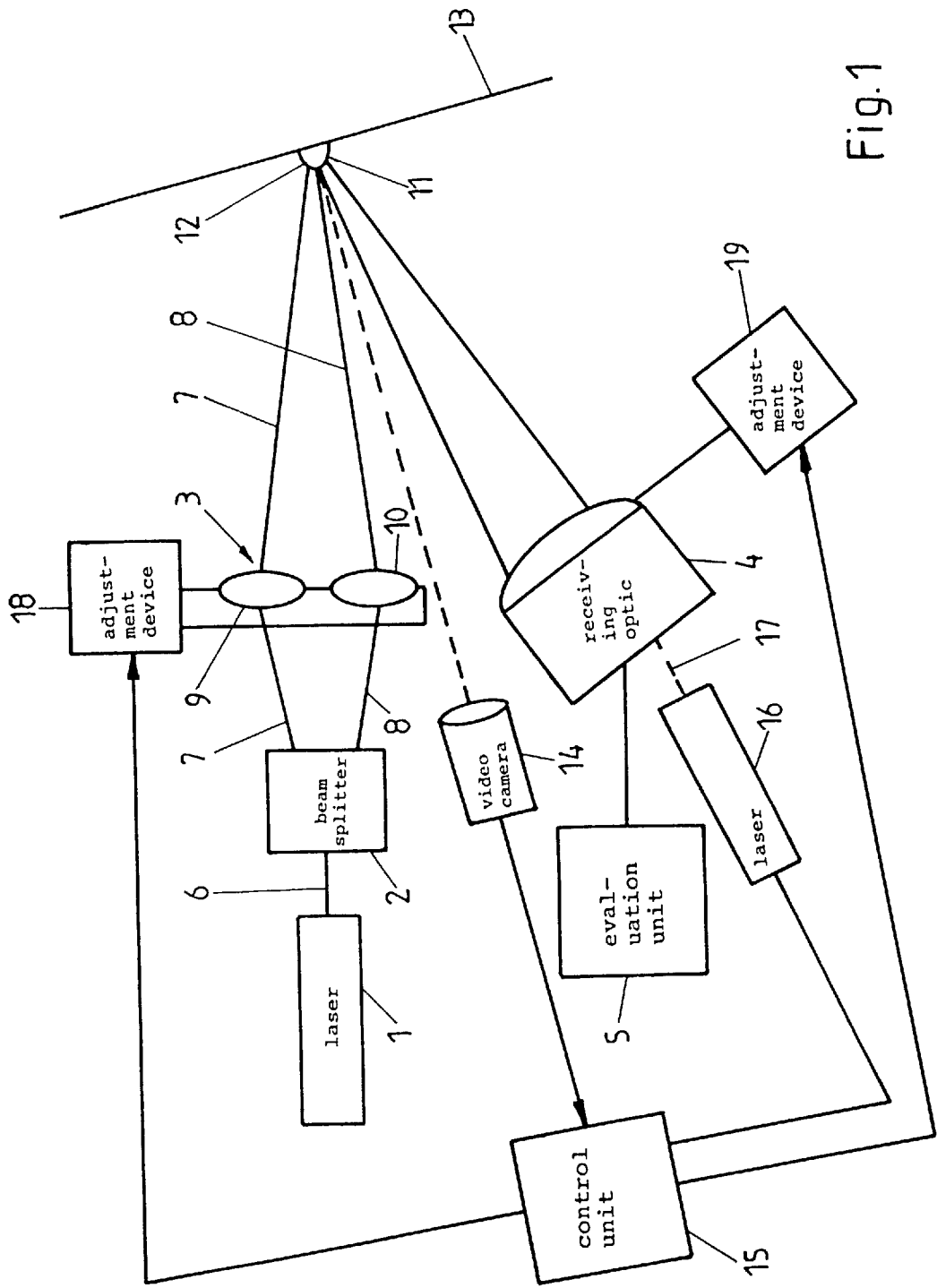
FIG. 1 shows the structure of a single-component laser doppler anemometer with add-ons for carrying out the method of the invention.

The laser doppler anemometer depicted in FIG. 1 comprises a laser 1, a beam splitter 2, an emitting optic 3, a receiving optic 4 and an evaluation unit 5. The laser light 6 emitted by laser 1 is split into two laser beams 7 and 8 in the beam splitter 2. The emitting optic 3, shown here with two separate objectives 9 and 10, focuses the two laser beams 7 and 8 at a common crossing point 11. Crossing point 11 coincides with focal point 12 of the receiving optic 4. The overlap area defines the measurement volume of the laser doppler anemometer 1–5. In this measurement volume, the speed of dispersed particles (not depicted here) in the direction of laser beams 7 and 8 can be determined with the aid of the evaluation unit 5. In order to adjust the laser doppler anemometer 1–5 the crossing point 11 and the focal point 12 are brought together onto a surface 13. Here the light intensity distribution across the surface 13 is monitored with a video camera 14. The signal of the video camera 14 is fed to a control unit 15. The control unit 15 controls a laser 16 for coupling laser light 17 into the output of the receiving optic 4. The control unit 15 further controls the adjustment units 18 and 19 for the emitting optic 3 and the receiving optic 4.

Figure 2:
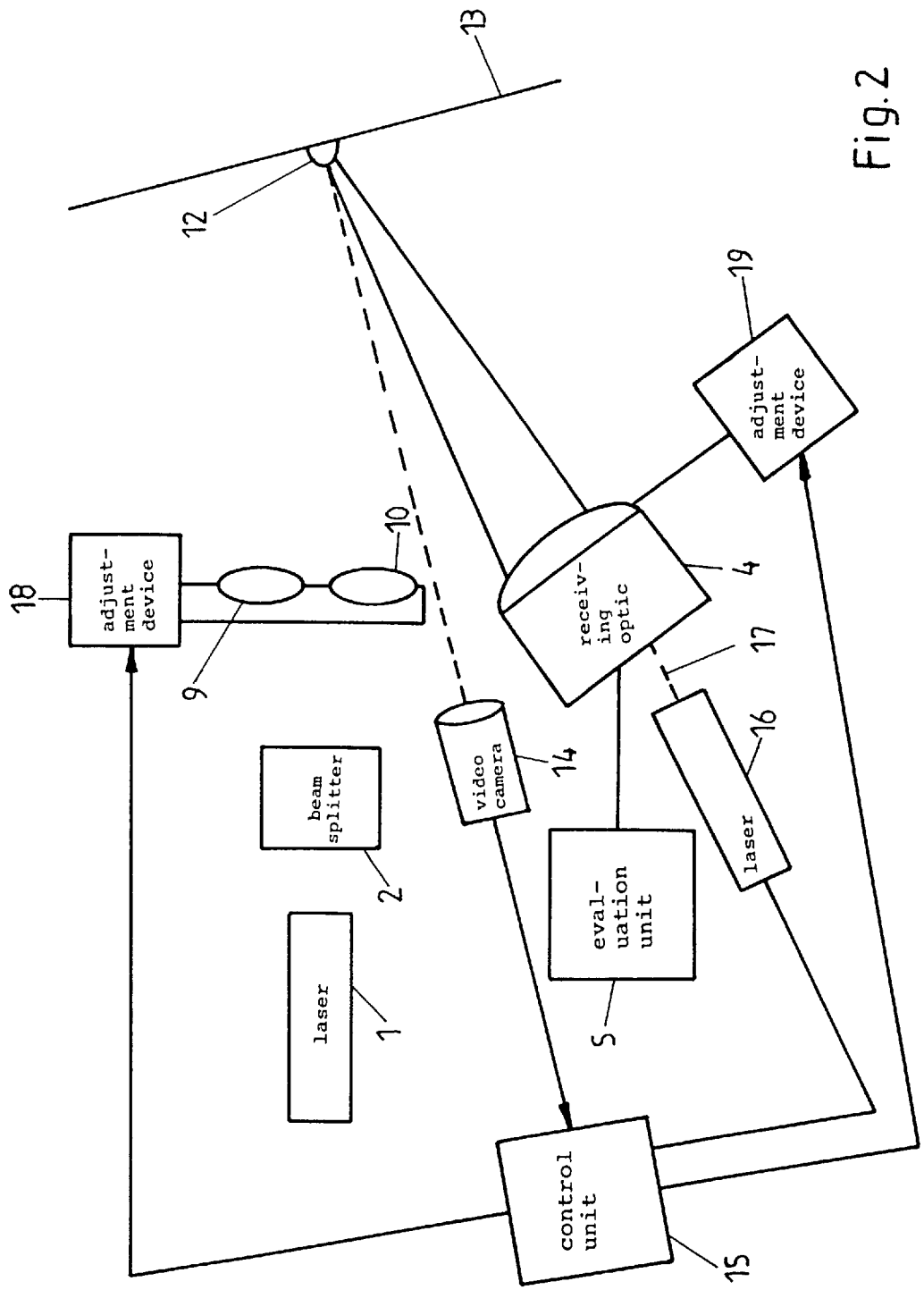
FIG. 2 shows how the focal point of the receiving optic of the laser doppler anemometer according to FIG. 1 is imaged onto a surface.
Figure 3A:
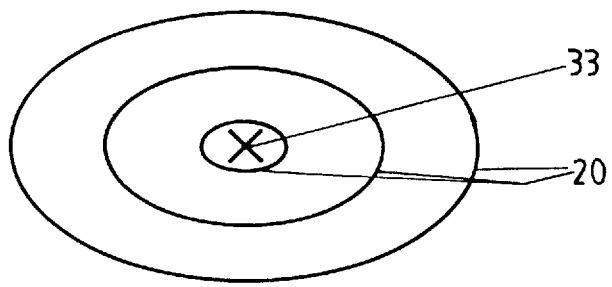
FIGS. 3a)–c) illustrate is a light intensity distribution across the surface according to FIG. 2 before adjustment.
Figure 3B:
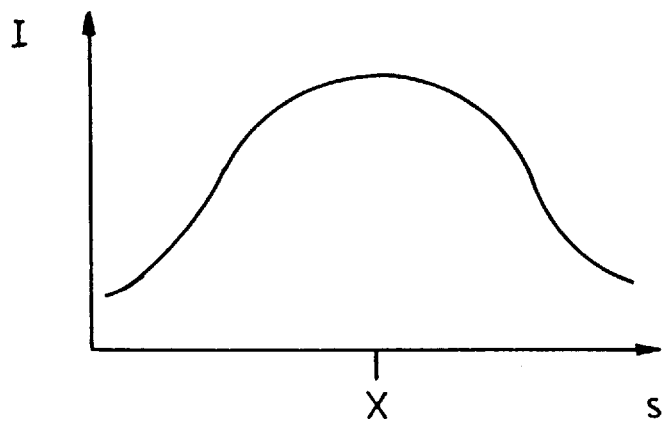
Figure 3C:
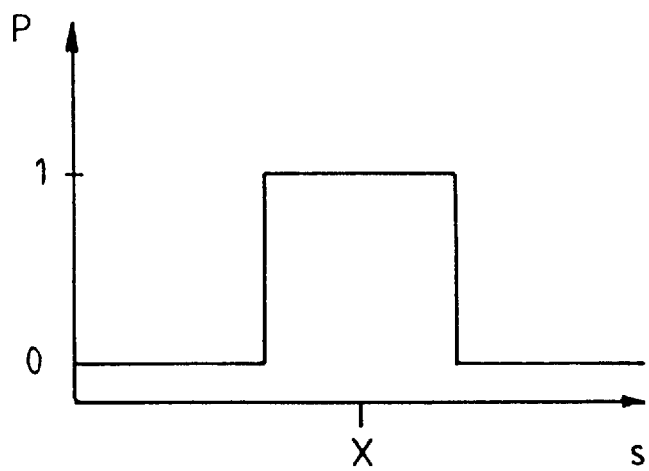

FIG. 2 illustrates how the focal point 12 of the receiving optic 4 of the laser doppler anemometer according to FIG. 1 is imaged onto a surface 13. The evaluation unit 5 is inactive, since the speed of particles is not determined during this procedure. First and in accordance with FIG. 2, the focal point 12 of the receiving optic 4 is imaged onto the surface 13 with laser 1 turned off. For this, laser light 17 is coupled by laser 16 into the output of the receiving optic 4. The light intensity distribution across the surface 13 which results from receiving optic 4 being out-of-focus with respect to surface 13 is reproduced in FIG. 3. This light intensity distribution is recorded with the video camera 14 and analyzed by the control unit 15. FIG. 3 a) shows the light distribution in the form of the isolux lines 20 of identical light intensity around the optical axis 33 of the receiving optic 4. In a cross section through the optical axis the light intensity distribution displays the curve emerging from FIG. 3b). FIG. 3c) shows the light intensity distribution according to FIG. 3b) after digitalization into two-level values 0 and 1. The width of the distribution in FIGS. 3b) and 3c) indicates that the receiving optic 4 is out-of-focus with respect to the distance to surface 13.

Figure 4A:
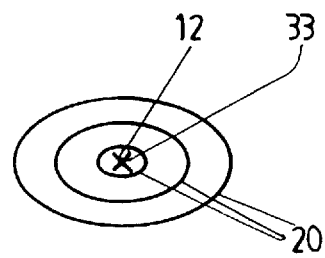
FIGS. 4a)–c) illustrate is a light intensity distribution across the surface according to FIG. 2 after adjustment.
Figure 4B:
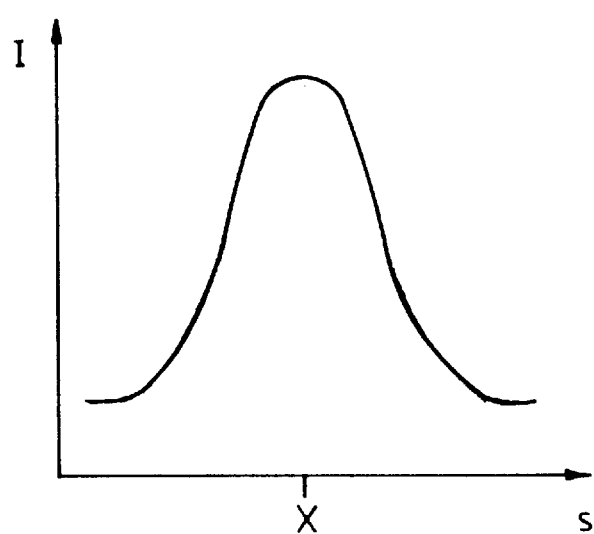
Figure 4C:
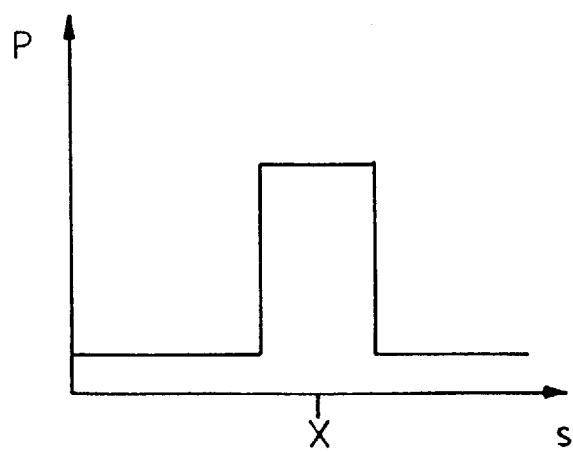

FIG. 4, on the other hand, shows the situation after remedial adjustment of the receiving optic 4 with respect to surface 13. In this case, the isolux lines 20 in FIG. 4a) are arranged more densely around the axis 33 and the light intensity distribution according to FIGS. 4b) and 4c) is noticeably narrower. By means of the dispersion of the light intensity, the control unit 15 can discover the required position of the receiving optic 4 in relation to the surface 13. The center point of the light intensity distribution according to FIG. 4 coincides with the optical axis 33. The position of the center point can be easily determined from the digitalized light intensity distribution. This position with respect to the video camera 14 can be captured by the control unit 15 even after laser 16 has been turned off.

Figure 6A:
FIGS. 6a)–b) illustrate is a light intensity distribution across the surface before and after the adjustment according to FIG. 5.
Figure 6B:
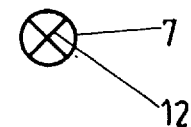
Figure 8A:
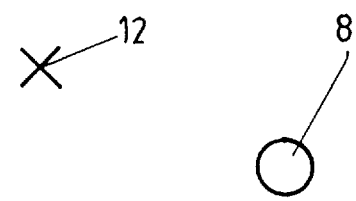
FIGS. 8a)–b) illustrate is a light intensity distribution across the surface before and after the adjustment according to FIG. 7.
Figure 8B:
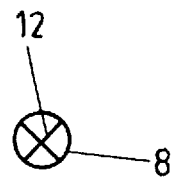

This is the case when adjusting the first laser beam 7 according to FIG. 5. In doing so, the second laser beam 8 has been tuned out or turned off. The laser beam 7 is focused on the surface by adjusting the emitting optic 3. Subsequently the imaging point of the laser beam 7 on the surface 13 is shifted until it falls on the focal point 12 of the receiving optic 4. In FIG. 6a) it is schematically depicted how the laser beam 7 at first falls on surface 13 at a distance from focal point 12. In FIG. 6b), the laser beam 7 and the focal point 12 are brought into coincidence. FIGS. 7 and 8 relate to the adjustment of the second laser beam 8 by adjusting the objective 10. Afterwards, the laser doppler anemometer 1–5 is completely adjusted, and the flow speed of particles dispersed in the measurement volume defined by the crossing point 11 of the laser beams 7 and 8 and the focal point 12 can be determined.

In case of changes inside the working section surrounding the surface 13, adjustment according to FIGS. 1 to 8 can be repeated in order to compensate for concomitant changes in operating conditions of the laser doppler anemometer. Such changes could, for instance, affect the refraction index of a fluid flowing in the wind tunnel.

Figure 9A:
FIGS. 9a)–c) illustrate is a light intensity distribution before, during and after an adjustment of the crossing point of the laser beams to the focal point of the receiving optic under an alternative procedure to the one according to FIGS. 5 and 7.
Figure 9B:
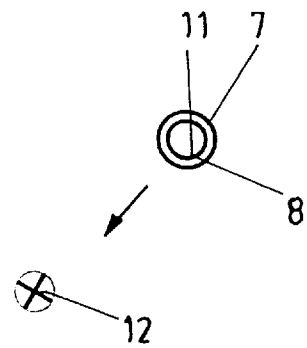
Figure 9C:
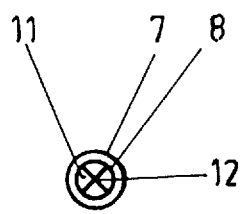

FIG. 9 schematically illustrates the adjustment of the laser beams 7 and 8 to the focal point 12 of the receiving optic in a laser doppler anemometer whose emitting optic only displays one common objective for the two laser beams 7 and 8. In this case, the two laser beams 7 and 8 should be brought into coincidence on surface 13 and then aimed at the focal point 12. In FIG. 9 it is depicted how at first the laser beams 7 and 8 are brought into coincidence at crossing point 11 and subsequently crossing point 11 is aimed at focal point 12. This at first corresponds to a reduction in the dispersion of the light intensity over the surface 13, since dispersion of light intensity is minimal if the laser beams 7 and 8 are focused on surface 13 and coincide there. Next the center point of the light intensity distribution is adjusted to the focal point 12. The reverse procedure is also possible, where at first the center point of the light intensity distribution is adjusted to the focal point 12 and then dispersion is minimized.

Figure 10:
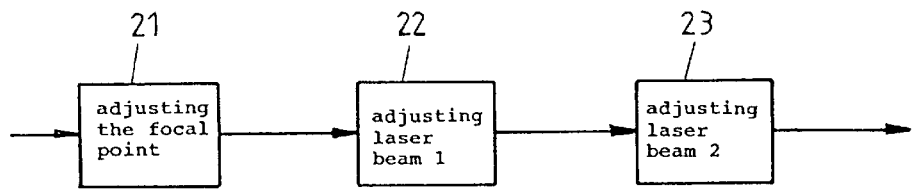
FIG. 10 is a block diagram of the embodiment of the method of FIGS. 1 through 8.

The block diagram in FIG. 10 corresponds to adjustment of the laser doppler anemometer according to FIGS. 1 to 8. At first in Step 21, laser light 17 is coupled into the output of the receiving optic 4. In step 21, laser 16 is focused by the receiving optic 4 in the focal point 12. The receiving optic 4 is adjusted until the focal point 12 lies on the surface 13. This procedure is monitored with the video camera 14 and controlled by the control unit 15 which analyzes the dispersion of the light intensity distribution over the surface 13. Thereafter, the position of the focal point 12 on the surface 13 is determined by the control unit 15 with the aid of the video camera 14 by means of the center point of the light intensity distribution. Then the laser light 17 coupled into the receiving optic 4 is turned off. In Step 22, the center point of the light intensity distribution of the impact point of the laser beam 7 onto the surface 13 is determined from the light intensity recorded by the video camera 14. Next, the laser beam 7 is shifted by adjusting the emitting optic until its center point coincides with the position of the focal point 12 on the surface 13. In Step 23 the procedure of Step 22 is repeated for laser beam 8. After Steps 21 to 23, the laser doppler anemometer 1 through 5 is properly adjusted.

Figure 11:
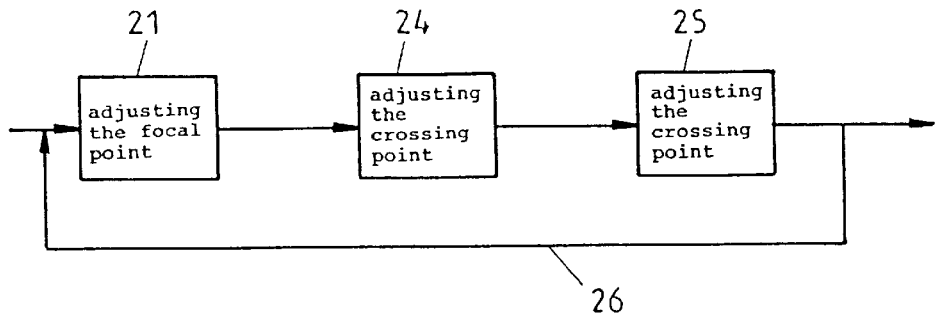
FIG. 11 is a block diagram of the embodiment of the method of FIG. 9.

The procedure of FIG. 9 is illustrated in FIG. 11 as a block diagram. Here too the procedure begins with Step 21. Next in Step 24 the dispersion of the light intensity distribution of the two laser beams 7 and 8, simultaneously impacting on the surface 13, is minimized until laser beams 7 and 8 fall onto the surface 13 at their crossing point 11. Then in Step 25 the crossing point 11 is aimed at the focal point 12 of the receiving optic 14. The two Steps 24 and 25 are monitored by the control unit 15 via the video camera 14. In FIG. 11 a loop 26 is depicted, which stands for the alternating repetition of the adjustment Steps 21 to 25 in order to adapt the laser doppler anemometer to the working section's changing operating conditions.

Figure 12:
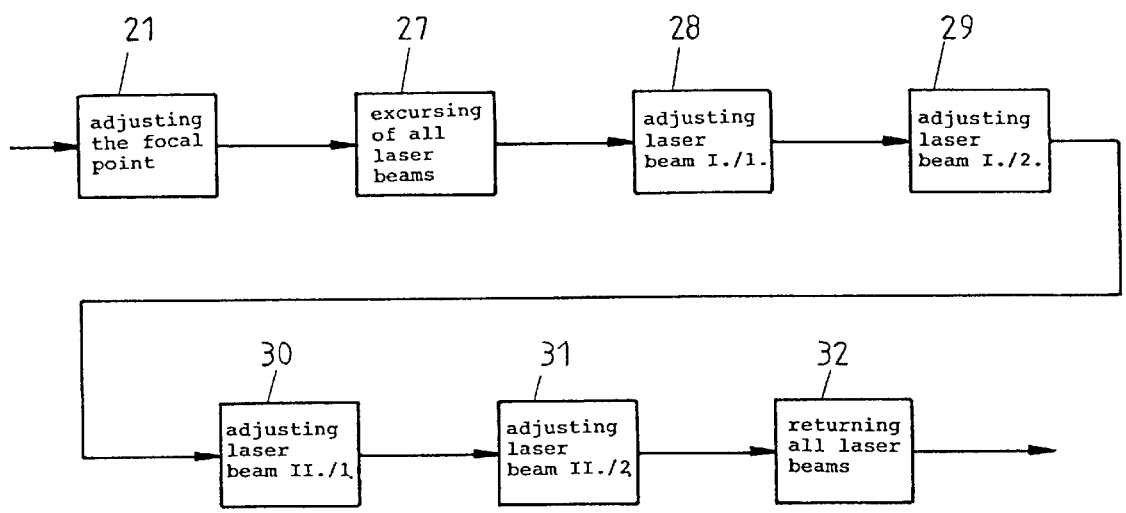
FIG. 12 is a block diagram of a further embodiment of the method of the invention.

FIG. 12 illustrates the procedure when adjusting a multicomponent laser doppler anemometer. Here as well, the procedure begins with Step 21. Thereafter in a Step 27, all laser beams for all components are shifted so that they no longer fall within the field of vision of the video camera 14. That means that all laser beams are excursed. Therefore, step 27 shown in FIG. 10 is referred to as "excursion of all laser beams". The shifts made for this purpose are stored in the control unit 15. In Step 28 the first laser beam I./1. of the first component I. is adjusted to the focal point 12 of the receiving optic. To that extend, Step 28 corresponds to Step 22 of FIG. 10. Then this laser beam is again shifted out of the field of vision of the video camera 14, once again in a controlled manner. In Step 29 the same procedure is carried out for the second laser beam I./2. of the first component I. In the following Step 30, the procedure of Steps 28 and 29 is carried out for the first laser beam II./1. of a second component II., and in Step 31 for the second laser beam II./2. of the second component II. FIG. 12 is in so far related to a two-component laser doppler anemometer. Otherwise the laser beams of the further components would have to be adjusted and then to be shifted out of the field of vision of the video camera 14 one after another. In Step 32, all laser beams are then shifted back into the field of vision of the camera 14 by rescinding the previous shift. This can be confirmed by checking the resulting light intensity distribution across the surface 13. This light intensity distribution shows minimal dispersion despite the number of laser beams impacting.

The calculation of the center point of the light intensity distribution from the digitalized image of a video camera is just as well known and familiar as the determination of the dispersion of the light intensity distribution. For determining the center point in a two-level image where every image point displays a line value and a column value, it suffices to sum up all the line values and all the column values of the image point of level 1 and to divide each of these sums by the number of image points of level 1. The results are the line value and the column value of the center point of the light intensity distribution. The dispersion of the light intensity can be calculated as the sum of the linear or quadratic deviations of the individual image points of level 1 from this center point. These sums correspond to the mean variation and the mean square variation of the light intensity from the center point. Other methods of calculation for determining the center point of a light intensity distribution are known. They may in some cases increase the precision of the new method but they do not change the principle upon which it is based.

While preferred embodiments of the invention have been disclosed in the foregoing specification, it is understood by those skilled in the art that variations and modifications thereof can be made without departing from the spirit and scope of the invention, as set forth in the following claims.

LIST OF REFERENCE SIGNS

1—Laser
2—Beam splitter
3—Emitting optic
4—Receiving optic
5—Evaluation unit
6—Laser light
7—Laser beam
8—Laser beam
9—Objective
10—Objective
11—Crossing point
12—Focal point
13—Surface
14—Video camera
15—Control unit
16—Laser
17—Laser light
18—Adjustment device
19—Adjustment device
20—Isolux line
21—Step: adjusting the focal point
22—Step: adjusting laser beam 1
23—Step: adjusting laser beam 2
24—Step: adjusting the crossing point
25—Step: adjusting the crossing point
26—Loop
27—Step: excursing of all laser beams
28—Step: adjusting laser beam I./1.
29—Step: adjusting laser beam I./2.
30—Step: adjusting laser beam II./1.
31—Step: adjusting laser beam II./2.
32—Step: returning all laser beams
33—Optical axis

We claim:

1. A method of adjusting a laser doppler anemometer, the anemometer having an emitting optic constructed and arranged to emit at least two laser beams onto a spaced surface, and a receiving optic for gathering light scattered by dispersed particles, said method comprising the steps of:

coupling a laser light into an output of the receiving optic to make a focal point of the receiving optic visible on the surface;

adjusting the receiving optic with respect to the surface so that the focal point of the receiving optic lies on the surface; and adjusting and regulating the emitting optic and the receiving optic with respect to each other so that a crossing point of the at least two laser beams coincides with the focal point of the receiving optic on the surface.

2. The method of claim 1, further comprising the step of adjusting the receiving optic with respect to the surface, and then adjusting the emitting optic with respect to the receiving optic.

3. The method of to claim 1, further comprising the steps of directing the at least two laser beams away from the surface as the focal point of the receiving optic is adjusted with respect to the surface, and decoupling said laser light from the output of the receiving optic as the crossing point of the laser beams is adjusted with respect to the surface.

4. The method of claim 1, further comprising the steps of directing each of the at least two laser beams at the surface separately from each other, adjusting the emitting optic for each of the at least two laser beams, and moving the at least two laser beams to a specified point on the surface in response thereto.

5. The method of claim 1, further comprising the step of determining the respective positions of the focal point and of the crossing point on the surface by recording a center point of the light intensity distribution across the surface.

6. The method of claim 5, comprising the step of recording the center point of the light intensity distribution across the surface with a video camera oriented perpendicularly with respect to the surface.

7. The method of claim 6, comprising the step of digitizing the light intensity distribution recorded by the video camera into a two-level image.

8. The method of claim 5, further comprising the step of automatically adjusting the emitting optic and the receiving optic as a function of a closed loop control, and basing the feedback of the closed loop control on the light intensity distribution across the surface.

9. The method of claim 5, comprising the step of determining the variation of the light intensity distribution from said center point across at least a portion of the surface.

10. The method of claim 1, wherein the steps of adjusting the receiving optic and the emitting optic are automatically repeated at predetermined intervals.

11. The method of claim 1, further comprising the step of determining the respective positions of the at least two laser beams on the surface by recording a center point of the light intensity distribution across the surface.

12. The method of claim 1, further comprising the step of first adjusting the emitting optic with respect to the surface, and then adjusting the receiving optic with respect to the emitting optic.

13. The method of claim 2, further comprising the step of capturing the adjustment of the receiving optic in response thereto.

14. The method of claim 1, further comprising the step of adjusting the receiving optic with respect to the focal point, next adjusting the emitting optic with respect to the focal point, and then capturing the adjustment of the receiving optic in response thereto.

15. The method of claim 14, comprising the step of adjusting each of the at least two laser beams with respect to the focal point separately of one another with the emitting optic.

16. A method of adjusting a laser doppler anemometer used to measure air speed, said method comprising the steps of:

focusing a receiving optic on a reference surface spaced from the receiving optic and defining a visible focal point on the surface in response thereto;

emitting at least two laser beams from an emitting optic and directing the at least two laser beams toward the surface;

moving the at least two laser beams into coincidence with one another at a crossing point defined on the surface and then moving the crossing point into coincidence with the focal point; and automatically and continuously adjusting the emitting optic and the receiving optic with respect to each other so that the crossing point stays in coincidence with the focal point.

17. The method of claim 16, wherein the step of moving the crossing point into coincidence with the focal point includes the step of defining a measurement area on the surface.

18. The method of claim 17, comprising the step of monitoring a light intensity distribution in the measurement area and maintaining the crossing point in coincidence with the focal point in response thereto.

19. A method of adjusting a laser doppler anemometer used to measure air speed, said method comprising the steps of:

focusing a receiving optic on a reference surface spaced from the receiving optic and defining a visible focal point on the surface in response thereto;

emitting a first laser beam from an emitting optic toward the surface;

moving the first laser beam across the surface and into coincidence with the focal point;

emitting a second laser beam from the emitting optic toward the surface;

moving the second laser beam across the surface and into coincidence with the focal point; and automatically and continuously adjusting the emitting optic and the receiving optic with respect to each other so that the first and the second laser beams, respectively, each stay in coincidence with the focal point.

* * * * *